United States Patent
Caldara et al.

(10) Patent No.: US 6,236,655 B1
(45) Date of Patent: *May 22, 2001

(54) PORT AND LINK IDENTIFICATION

(75) Inventors: Stephen A. Caldara, Sudbury; Stephen A. Hauser, Burlington; Thomas A. Manning, Northboro, all of MA (US)

(73) Assignees: Fujitsu Network Communications, Inc., Richardson, TX (US); Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/685,194

(22) Filed: Jul. 18, 1996

Related U.S. Application Data

(60) Provisional application No. 60/001,498, filed on Jul. 19, 1995.

(51) Int. Cl.[7] .................................................. H04L 12/28
(52) U.S. Cl. ........................................... 370/395; 370/399
(58) Field of Search ..................................... 370/399, 395, 370/397, 254, 255, 252, 229, 230, 396

(56) References Cited

U.S. PATENT DOCUMENTS

| | | | |
|---|---|---|---|
| 3,804,991 | 4/1974 | Hammond et al. | 179/26 |
| 3,974,343 | 8/1976 | Cheney et al. | 179/18 ES |
| 4,069,399 | 1/1978 | Barrett et al. | 179/15 AL |
| 4,084,228 | 4/1978 | Dufond et al. | 364/200 |
| 4,240,143 | 12/1980 | Bessemer et al. | 364/200 |
| 4,603,382 | 7/1986 | Cole et al. | 364/200 |
| 4,715,030 | 12/1987 | Koch et al. | 370/85 |
| 4,727,537 | 2/1988 | Nichols | 370/85 |
| 4,737,953 | 4/1988 | Koch et al. | 370/94 |
| 4,748,658 | 5/1988 | Gopal et al. | 379/221 |
| 4,797,881 | 1/1989 | Ben-Artzi | 370/88 |
| 4,821,034 | 4/1989 | Anderson et al. | 340/825.8 |
| 4,837,761 | 6/1989 | Isono et al. | 370/60 |
| 4,849,968 | 7/1989 | Turner | 370/94 |
| 4,870,641 | 9/1989 | Pattavina | 370/60 |
| 4,872,157 | 10/1989 | Hemmady et al. | 370/60 |
| 4,872,159 | 10/1989 | Hemmady et al. | 370/60 |
| 4,872,160 | 10/1989 | Hemmady et al. | 370/60 |
| 4,872,197 | 10/1989 | Pemmaraju | 379/93 |
| 4,878,216 | 10/1989 | Yunoki | 370/60 |
| 4,893,302 | 1/1990 | Hemmady et al. | 370/60 |

(List continued on next page.)

FOREIGN PATENT DOCUMENTS 484943   3/1992   (JP) .

*Primary Examiner*—Douglas W. Olms
*Assistant Examiner*—Ricardo M. Pizarro
(74) *Attorney, Agent, or Firm*—Weingarten, Schurgin, Gagnebin & Hayes LLP

(57) ABSTRACT

A system (10) is provided for identifying a processing port (12) and a link (22) at which a cell (24) is received. The system (10) includes a logical link table (14) having a plurality of logical link entries (30). Each logical link entry (30), which corresponds to a particular link (22) of a processing port (12) associated with the logical link table (14), specifies a numerical value. The processing port (12) may receive the cell (24) at one of a plurality of links (22). The processing port (12) can convert the cell (24) by replacing a numerical value of an identification field, such as a virtual channel identification field (28), of the cell (24) with the numerical value specified by the logical link entry (30) corresponding to the link (22) at which the cell (24) is received. A switch control module (18), which is connected to the processing port (12), may receive the converted cell (38). The switch control module (18) can identify the link (22) and the processing port (12) at which the cell (24) corresponding to the converted cell (38) was received by referencing a reverse mapping table (20) using the numerical value of the logical link entry (30) in the converted cell (38).

26 Claims, 2 Drawing Sheets

U.S. PATENT DOCUMENTS

| | | | |
|---|---|---|---|
| 4,893,307 | 1/1990 | McKay et al. | 370/94.1 |
| 4,894,824 | 1/1990 | Hemmady et al. | 370/58.3 |
| 4,897,833 | 1/1990 | Kent et al. | 370/85.2 |
| 4,897,841 | 1/1990 | Gang, Jr. | 370/85.13 |
| 4,899,333 | 2/1990 | Roediger | 370/60 |
| 4,920,531 | 4/1990 | Isono et al. | 370/60 |
| 4,922,503 | 5/1990 | Leone | 370/85.13 |
| 4,933,938 | 6/1990 | Sheehy | 370/85.13 |
| 4,942,574 | 7/1990 | Zelle | 370/85.15 |
| 4,947,390 | 8/1990 | Sheehy | 370/85.13 |
| 4,953,157 | 8/1990 | Franklin et al. | 370/60 |
| 4,956,839 | 9/1990 | Torii et al. | 370/60 |
| 4,958,341 | 9/1990 | Hemmady et al. | 370/60.1 |
| 4,979,100 | 12/1990 | Makris et al. | 364/200 |
| 4,993,018 | 2/1991 | Hajikano et al. | 370/60 |
| 5,014,192 | 5/1991 | Mansfield et al. | 364/200 |
| 5,021,949 | 6/1991 | Morten et al. | 364/200 |
| 5,029,164 | 7/1991 | Goldstein et al. | 370/95.1 |
| 5,060,228 | 10/1991 | Tsutsui et al. | 370/85.13 |
| 5,067,123 | 11/1991 | Hyodo et al. | 370/58.1 |
| 5,070,498 | 12/1991 | Kakuma et al. | 370/60 |
| 5,083,269 | 1/1992 | Syobatake et al. | 395/425 |
| 5,084,867 | 1/1992 | Tachibana et al. | 370/60 |
| 5,084,871 | 1/1992 | Carn et al. | 370/94.1 |
| 5,090,011 | 2/1992 | Fukuta et al. | 370/60 |
| 5,090,024 | 2/1992 | Vander Mey et al. | 375/1 |
| 5,093,827 | 3/1992 | Franklin et al. | 370/60.1 |
| 5,093,912 | 3/1992 | Dong et al. | 395/650 |
| 5,115,429 | 5/1992 | Hluchyj et al. | 370/84 |
| 5,119,369 | 6/1992 | Tanabe et al. | 370/60 |
| 5,119,372 | 6/1992 | Verbeek | 370/85.3 |
| 5,128,932 | 7/1992 | Li | 370/60 |
| 5,130,975 | 7/1992 | Akata | 370/60 |
| 5,130,982 | 7/1992 | Ash et al. | 370/85.7 |
| 5,132,966 | 7/1992 | Hayano et al. | 370/79 |
| 5,146,474 | 9/1992 | Nagler et al. | 375/10 |
| 5,146,560 | 9/1992 | Goldberg et al. | 395/200 |
| 5,150,358 | 9/1992 | Punj et al. | 370/84 |
| 5,151,897 | 9/1992 | Suzuki | 370/85.13 |
| 5,157,657 | 10/1992 | Potter et al. | 370/85 |
| 5,163,045 | 11/1992 | Caram et al. | 370/60.1 |
| 5,163,046 | 11/1992 | Hahne et al. | 370/79 |
| 5,179,556 | 1/1993 | Turner | 370/94.1 |
| 5,179,558 | 1/1993 | Thacker et al. | 370/94.3 |
| 5,185,743 | 2/1993 | Murayama et al. | 370/110.1 |
| 5,191,582 | 3/1993 | Upp | 370/94.1 |
| 5,191,652 | 3/1993 | Dias et al. | 395/200 |
| 5,193,151 | 3/1993 | Jain | 395/200 |
| 5,197,067 | 3/1993 | Fujimoto et al. | 370/94.1 |
| 5,198,808 | 3/1993 | Kudo | 340/825.8 |
| 5,199,027 | 3/1993 | Barri | 370/60 |
| 5,239,539 | 8/1993 | Uchida et al. | 370/58.3 |
| 5,253,247 | 10/1993 | Hirose et al. | 370/14 |
| 5,253,248 | 10/1993 | Dravida et al. | 370/16 |
| 5,255,264 | 10/1993 | Cotton et al. | 370/24 |
| 5,255,266 | 10/1993 | Watanabe et al. | 370/60 |
| 5,257,311 | 10/1993 | Naito et al. | 380/48 |
| 5,258,979 | 11/1993 | Oomuro et al. | 370/95.1 |
| 5,265,088 | 11/1993 | Takigawa et al. | 370/15 |
| 5,267,232 | 11/1993 | Katsube et al. | 370/17 |
| 5,268,897 | 12/1993 | Komine et al. | 370/60 |
| 5,271,010 | 12/1993 | Miyake et al. | 370/94.1 |
| 5,272,697 | 12/1993 | Fraser et al. | 370/61 |
| 5,274,641 | 12/1993 | Shobatake et al. | 370/94.1 |
| 5,274,768 | 12/1993 | Traw et al. | 395/275 |
| 5,280,469 | 1/1994 | Taniguchi et al. | 370/13 |
| 5,280,470 | 1/1994 | Buhrke et al. | 370/13 |
| 5,282,201 | 1/1994 | Frank et al. | 370/94.1 |
| 5,283,788 | 2/1994 | Morita et al. | 370/110.1 |
| 5,285,446 | 2/1994 | Yonehara | 370/60.1 |
| 5,287,349 | 2/1994 | Hyodo et al. | 370/60.1 |
| 5,287,535 | 2/1994 | Sakagawa et al. | 370/60 |
| 5,289,462 | 2/1994 | Ahmadi et al. | 370/60.1 |
| 5,289,463 | 2/1994 | Mobasser | 370/68.1 |
| 5,289,470 | 2/1994 | Chang et al. | 370/94.1 |
| 5,291,481 | 3/1994 | Doshi et al. | 370/79 |
| 5,291,482 | 3/1994 | McHarg et al. | 370/60 |
| 5,295,134 | 3/1994 | Yoshimura et al. | 370/16 |
| 5,301,055 | 4/1994 | Bagchi et al. | 359/139 |
| 5,301,184 | 4/1994 | Uriu et al. | 370/60 |
| 5,301,190 | 4/1994 | Tsukuda et al. | 370/66 |
| 5,301,193 | 4/1994 | Toyofuku et al. | 370/94.1 |
| 5,303,232 | 4/1994 | Proctor et al. | 370/94 |
| 5,305,311 | 4/1994 | Lyles | 370/60 |
| 5,309,431 | 5/1994 | Tominaga et al. | 370/60 |
| 5,309,438 | 5/1994 | Nakajima | 370/94.1 |
| 5,311,586 | 5/1994 | Bogart et al. | 379/221 |
| 5,313,454 | 5/1994 | Bustini et al. | 370/13 |
| 5,313,458 | 5/1994 | Suzuki | 370/60 |
| 5,315,586 | 5/1994 | Charvillat | 370/60 |
| 5,319,638 | 6/1994 | Lin | 370/60 |
| 5,321,695 | 6/1994 | Faulk, Jr. | 370/60 |
| 5,323,389 | 6/1994 | Bitz et al. | 370/60.1 |
| 5,333,131 | 7/1994 | Tanabe et al. | 370/54 |
| 5,333,134 | 7/1994 | Ishibashi et al. | 370/94.1 |
| 5,335,222 | 8/1994 | Kamoi et al. | 370/60 |
| 5,335,325 | 8/1994 | Frank et al. | 395/200 |
| 5,339,310 | 8/1994 | Taniguchi | 370/60 |
| 5,339,317 | 8/1994 | Tanaka et al. | 370/85.15 |
| 5,339,318 | 8/1994 | Tanaka et al. | 370/110.1 |
| 5,341,366 | 8/1994 | Soumiya et al. | 370/17 |
| 5,341,373 | 8/1994 | Ishibashi et al. | 370/85.9 |
| 5,341,376 | 8/1994 | Yamashita | 370/99 |
| 5,341,483 | 8/1994 | Frank et al. | 395/400 |
| 5,345,229 | 9/1994 | Olnowich et al. | 340/825.8 |
| 5,350,906 | 9/1994 | Brody et al. | 235/379 |
| 5,355,372 | 10/1994 | Sengupta et al. | 370/60 |
| 5,357,506 | 10/1994 | Sugawara | 370/60 |
| 5,357,507 | 10/1994 | Hughes et al. | 370/60 |
| 5,357,508 | 10/1994 | Le Boudec et al. | 370/58.3 |
| 5,357,510 | 10/1994 | Norizuki et al. | 370/60.1 |
| 5,359,600 | 10/1994 | Ueda et al. | 370/60.1 |
| 5,361,251 | 11/1994 | Aihara et al. | 370/60 |
| 5,361,372 | 11/1994 | Rege et al. | 395/800 |
| 5,363,433 | 11/1994 | Isono | 379/92 |
| 5,363,497 | 11/1994 | Baker et al. | 395/425 |
| 5,365,514 | 11/1994 | Hershey et al. | 370/17 |
| 5,369,570 | 11/1994 | Parad | 364/401 |
| 5,371,893 | 12/1994 | Price et al. | 395/725 |
| 5,373,504 | 12/1994 | Tanaka et al. | 370/60.1 |
| 5,375,117 | 12/1994 | Morita et al. | 370/79 |
| 5,377,262 | 12/1994 | Bales et al. | 379/220 |
| 5,377,327 | 12/1994 | Jain et al. | 395/200 |
| 5,379,297 | 1/1995 | Glover et al. | 370/60.1 |
| 5,379,418 | 1/1995 | Shimazaki et al. | 395/575 |
| 5,390,170 | 2/1995 | Sawant et al. | 370/58.1 |
| 5,390,174 | 2/1995 | Jugel | 370/60 |
| 5,390,175 | 2/1995 | Hiller et al. | 370/60 |
| 5,392,402 | 2/1995 | Robrock, II | 395/200 |
| 5,394,396 | 2/1995 | Yoshimura et al. | 370/60 |
| 5,398,235 | 3/1995 | Tsuzuki et al. | 370/16 |
| 5,400,337 | 3/1995 | Munter | 370/60.1 |
| 5,402,415 | 3/1995 | Turner | 370/60 |
| 5,412,648 | 5/1995 | Fan | 370/60 |
| 5,414,703 | 5/1995 | Sakaue et al. | 370/60 |
| 5,418,942 | 5/1995 | Krawchuk et al. | 395/600 |
| 5,420,858 | 5/1995 | Marshall et al. | 370/60.1 |
| 5,420,988 | 5/1995 | Elliott | 395/275 |
| 5,422,879 | 6/1995 | Parsons et al. | 370/60 |
| 5,425,021 | 6/1995 | Derby et al. | 370/54 |
| 5,425,026 | 6/1995 | Mori | 370/250 |

| Patent | Date | Inventor | Class |
|---|---|---|---|
| 5,426,635 | 6/1995 | Mitra et al. | 370/60 |
| 5,432,713 | 7/1995 | Takeo et al. | 364/514 |
| 5,432,784 | 7/1995 | Ozveren | 370/79 |
| 5,432,785 | 7/1995 | Ahmed et al. | 370/79 |
| 5,432,908 | 7/1995 | Heddes et al. | 395/250 |
| 5,436,886 | 7/1995 | McGill | 370/16 |
| 5,436,893 | 7/1995 | Barnett | 370/60.1 |
| 5,440,547 | 8/1995 | Easki et al. | 370/60 |
| 5,444,702 | 8/1995 | Burnett et al. | 370/60.1 |
| 5,446,733 | 8/1995 | Tsuruoka | 370/60.1 |
| 5,446,737 | 8/1995 | Cidon et al. | 370/85.5 |
| 5,446,738 | 8/1995 | Kim et al. | 370/94.2 |
| 5,448,559 | 9/1995 | Hayter et al. | 370/60.1 |
| 5,448,621 | 9/1995 | Knudsen | 379/58 |
| 5,450,406 | 9/1995 | Esaki et al. | 370/60.1 |
| 5,452,296 | 9/1995 | Shimizu | 370/60.1 |
| 5,452,299 | 9/1995 | Thessin et al. | 370/62 |
| 5,455,820 | 10/1995 | Yamada | 370/17 |
| 5,455,825 | 10/1995 | Lauer et al. | 370/60 |
| 5,457,687 | 10/1995 | Newman | 370/85.3 |
| 5,459,743 | 10/1995 | Fukuda et al. | 371/67.1 |
| 5,461,611 | 10/1995 | Drake, Jr. et al. | 370/54 |
| 5,463,629 | 10/1995 | Ko | 370/110.1 |
| 5,463,775 | 10/1995 | DeWitt et al. | 395/184.01 |
| 5,465,331 | 11/1995 | Yang et al. | 395/200 |
| 5,465,365 | 11/1995 | Winterbottom | 395/600 |
| 5,469,003 | 11/1995 | Kean | 326/39 |
| 5,473,608 | 12/1995 | Gagne et al. | 370/85.13 |
| 5,475,679 | 12/1995 | Munter | 370/58.2 |
| 5,479,401 | 12/1995 | Bitz et al. | 370/60.1 |
| 5,479,402 | 12/1995 | Hata et al. | 370/60.1 |
| 5,483,526 | 1/1996 | Ben-Nun et al. | 370/60.1 |
| 5,485,453 | 1/1996 | Wahlman et al. | 370/16 |
| 5,485,455 | 1/1996 | Dobbins et al. | 370/60 |
| 5,487,063 | 1/1996 | Kakuma et al. | 370/56 |
| 5,488,606 | 1/1996 | Kakuma et al. | 370/16 |
| 5,491,691 | 2/1996 | Shtayer et al. | 370/61 |
| 5,491,694 | 2/1996 | Oliver et al. | 370/85.4 |
| 5,493,566 | 2/1996 | Ljungberg et al. | 370/60 |
| 5,497,369 | 3/1996 | Wainwright | 370/60 |
| 5,499,238 | 3/1996 | Shon | 370/60.2 |
| 5,504,741 | 4/1996 | Yamanaka et al. | 370/58.2 |
| 5,504,742 | 4/1996 | Kakuma et al. | 370/60.1 |
| 5,506,834 | 4/1996 | Sekihata et al. | 370/17 |
| 5,506,839 | 4/1996 | Hatta | 370/60 |
| 5,506,956 | 4/1996 | Cohen | 395/182.04 |
| 5,509,001 | 4/1996 | Tachibana et al. | 370/17 |
| 5,509,007 | 4/1996 | Takashima et al. | 370/60.1 |
| 5,513,134 | 4/1996 | Cooperman et al. | 365/49 |
| 5,513,178 | 4/1996 | Tanaka | 370/58.2 |
| 5,513,180 | 4/1996 | Miyake et al. | 370/60.1 |
| 5,515,359 | 5/1996 | Zheng | 370/13 |
| 5,519,690 | 5/1996 | Suzuka et al. | 370/17 |
| 5,521,905 | 5/1996 | Oda et al. | 370/17 |
| 5,521,915 | 5/1996 | Dieudonne et al. | 370/60.1 |
| 5,521,916 | 5/1996 | Choudhury et al. | 370/60.1 |
| 5,521,917 | 5/1996 | Watanabe et al. | 370/1 |
| 5,521,923 | 5/1996 | Willmann et al. | 370/94.1 |
| 5,523,999 | 6/1996 | Takano et al. | 370/58.2 |
| 5,524,113 | 6/1996 | Gaddis | 370/60.1 |
| 5,526,344 | 6/1996 | Diaz et al. | 370/16 |
| 5,528,588 | 6/1996 | Bennett et al. | 370/60 |
| 5,528,590 | 6/1996 | Iidaka et al. | 370/60.1 |
| 5,528,591 | 6/1996 | Lauer | 370/79 |
| 5,530,695 | 6/1996 | Digne et al. | 370/17 |
| 5,533,009 | 7/1996 | Chen | 370/17 |
| 5,533,020 | 7/1996 | Byrn et al. | 370/60.1 |
| 5,535,196 | 7/1996 | Aihara et al. | 370/60 |
| 5,535,197 | 7/1996 | Cotton et al. | 370/60 |
| 5,537,394 | 7/1996 | Abe et al. | 370/17 |
| 5,541,912 | 7/1996 | Choudhury et al. | 370/17 |
| 5,544,168 | 8/1996 | Jeffrey et al. | 370/60.1 |
| 5,544,169 | 8/1996 | Norizuki et al. | 370/60.1 |
| 5,544,170 | 8/1996 | Kasahara | 370/84 |
| 5,546,389 | 8/1996 | Wippenbeck et al. | 370/60 |
| 5,546,391 | 8/1996 | Hochschild et al. | 370/60 |
| 5,546,392 | 8/1996 | Boal et al. | 370/60.1 |
| 5,550,821 | 8/1996 | Akiyoshi | 370/60.1 |
| 5,553,057 | 9/1996 | Nakayama | 370/13 |
| 5,553,068 | 9/1996 | Aso et al. | 370/60 |
| 5,555,243 | 9/1996 | Kakuma et al. | 370/58.2 |
| 5,555,256 * | 9/1996 | Calamvokis | 370/399 |
| 5,555,265 | 9/1996 | Kakuma et al. | 370/60 |
| 5,557,607 | 9/1996 | Holden | 370/58.2 |
| 5,568,475 * | 10/1996 | Doshi | 370/399 |
| 5,568,479 | 10/1996 | Watanabe et al. | 370/60.1 |
| 5,570,361 | 10/1996 | Norizuki et al. | 370/60.1 |
| 5,570,362 | 10/1996 | Nishimura | 370/60.1 |
| 5,572,522 | 11/1996 | Calamvokis et al. | 370/60.1 |
| 5,577,032 | 11/1996 | Sone et al. | 370/58.3 |
| 5,577,035 | 11/1996 | Hayter et al. | 370/60 |
| 5,583,857 | 12/1996 | Soumiya et al. | 370/233 |
| 5,583,858 | 12/1996 | Hanaoka | 370/392 |
| 5,583,861 | 12/1996 | Holden | 370/395 |
| 5,590,120 * | 12/1996 | Vaishnavi | 370/254 |
| 5,590,132 | 12/1996 | Ishibashi et al. | 370/236 |
| 5,602,829 | 2/1997 | Nie et al. | 370/235 |
| 5,610,913 | 3/1997 | Tomonaga et al. | 370/219 |
| 5,623,405 | 4/1997 | Isono | 395/230 |
| 5,625,846 | 4/1997 | Kobayakawa et al. | 395/872 |

* cited by examiner

PORT AND LINK IDENTIFICATION

RELATED PATENT APPLICATION

This application is related to U.S. Provisional Patent Application Ser. No. 60/001,498, filed Jul. 19, 1995.

TECHNICAL FIELD OF THE INVENTION

This invention relates generally to the field of communication systems, and more particularly to port and link identification.

BACKGROUND OF THE INVENTION

A communication system includes a collection of components that communicate, manipulate, and process information in a variety of ways. This system may support different access technologies, such as frame relay, circuit services, and new and evolving connection-based or connectionless services, that communicate information, such as data, voice, and video. Switches in the communication system employ hardware and software to route information generated by access technologies to an intended destination.

In such switches, different types of data cells are utilized to control switching connections. For example, a control cell can be used to establish communication on a connection or link. When a control cell of a particular type, such as a cell relating to an interim local management interface (ILMI), is processed at a switch control module, the switch control module (SCM) must be able to identify the port and link of origin for the control cell in order to establish communication. However, regardless of which link and processing port in a switch receives the cell of a particular type, the virtual path identification (VPI) field and the virtual channel identification (VCI) field of the control cell typically will be the same as the VPI field and VCI field, respectively, of other control cells of the same type. Thus, in some instances, the VPI/VCI identifier of a control cell cannot be used to identify a link and a port of origin for the control cell in a communication switch.

SUMMARY OF THE INVENTION

In accordance with the present invention, the disadvantages and problems associated with identifying a port and link of origin for a cell in a communication switch have been substantially reduced or eliminated.

In accordance with one embodiment of the present invention, a system is provided for identifying a processing port and a link at which a cell is received. The system includes a logical link table having a plurality of logical link entries. Each logical link entry, which corresponds to a particular link of a processing port associated with the logical link table, specifies a numerical value. The processing port may receive a cell at one of a plurality of links. The processing port can convert the cell by replacing a numerical value of an identification field, such as a virtual channel identification field, of the cell with the numerical value specified by the logical link entry corresponding to the link at which the cell is received. A switch control module, which is connected to the processing port, may receive the converted cell. The switch control module can identify the link and the processing port at which the cell corresponding to the converted cell was received by referencing a reverse mapping table using the numerical value of the logical link entry in the converted cell.

In accordance with another embodiment of the present invention, a method is provided for identifying a processing port and a link at which a cell is received. The method includes receiving a cell at one of a plurality of links of a processing port. A logical link table associated with the processing port is then referenced. The logical link table includes a plurality of logical link entries, each logical link entry corresponding to a particular link of the processing port and specifying a numerical value. The received cell is converted by replacing a numerical value of an identification field, such as a virtual channel identification field, of the cell with the numerical value specified by the logical link entry corresponding to the link at which the cell is received. The link and the processing port at which the cell was received can be identified by referencing a reverse mapping table using the numerical value specified by the logical link entry in the converted cell.

An important technical advantage of the present invention includes replacing a VCI value of a control cell with a specific logical link number corresponding to the link and port at which the control cell is received. A reverse mapping table contains information specifying which link and port are associated with each logical link number. The reverse mapping table may be accessed by the switch control module. Thus, when the switch control module processes the control cell, the switch control module is able to identify the link and port of origin for the cell using the reverse mapping table. This alleviates the need to set up a separate connection to receive control cells uniquely at each input link. A connection requires resources (queues, topology information) and is a resource to be conserved. This method allows there to be a single multipoint to point connection. Other important technical advantages are readily apparent to one skilled in the art from the following FIGURES, descriptions, and claims.

BRIEF DESCRIPTION OF THE DRAWINGS

For a more complete understanding of the present invention, and for further features and advantages, reference is now made to the following description taken in conjunction with the accompanying drawings, in which.

DETAILED DESCRIPTION OF THE INVENTION

Figure 1:
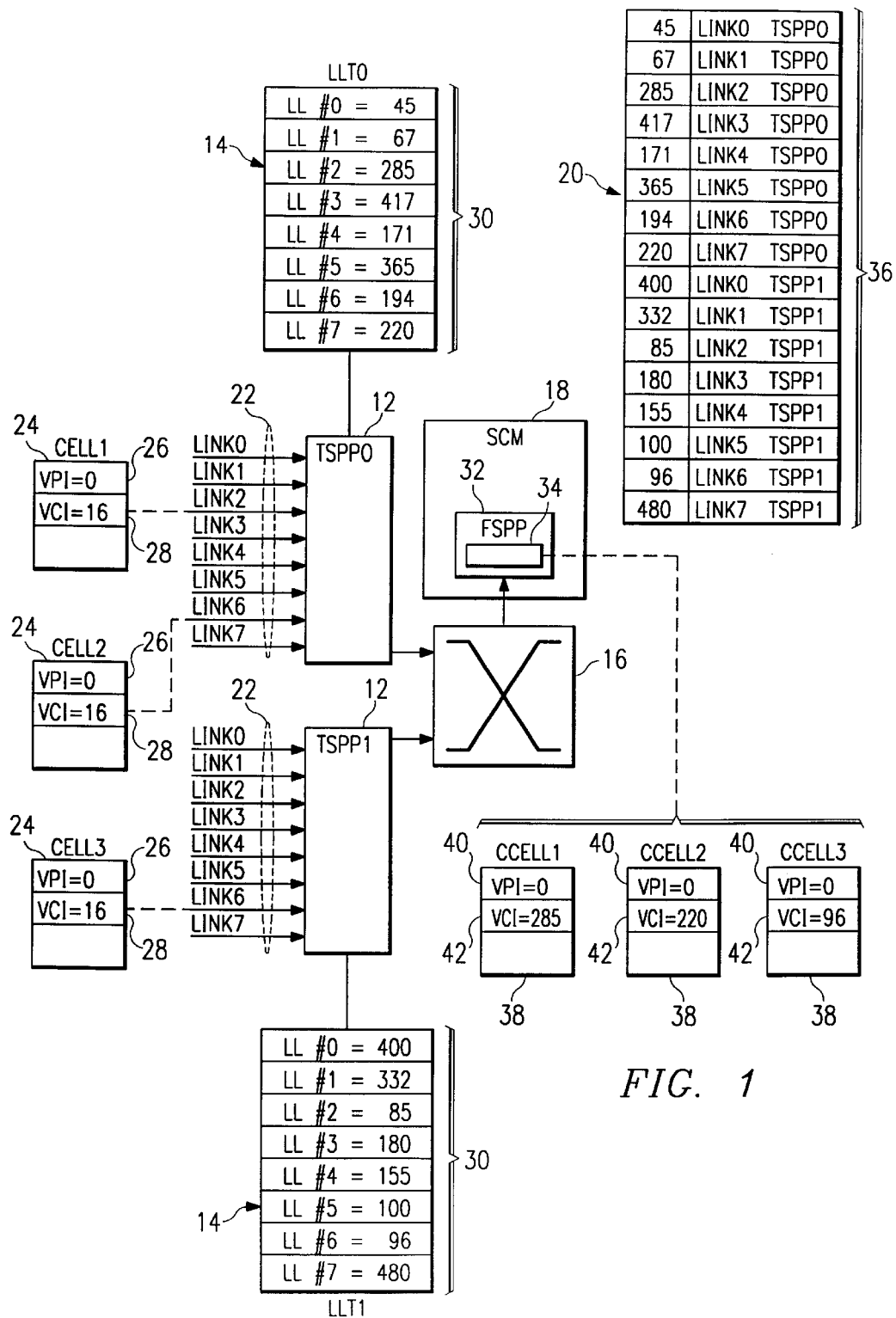
FIG. 1 illustrates a system for identifying a port and link of origin for a control cell in a communication switch.
Figure 2:
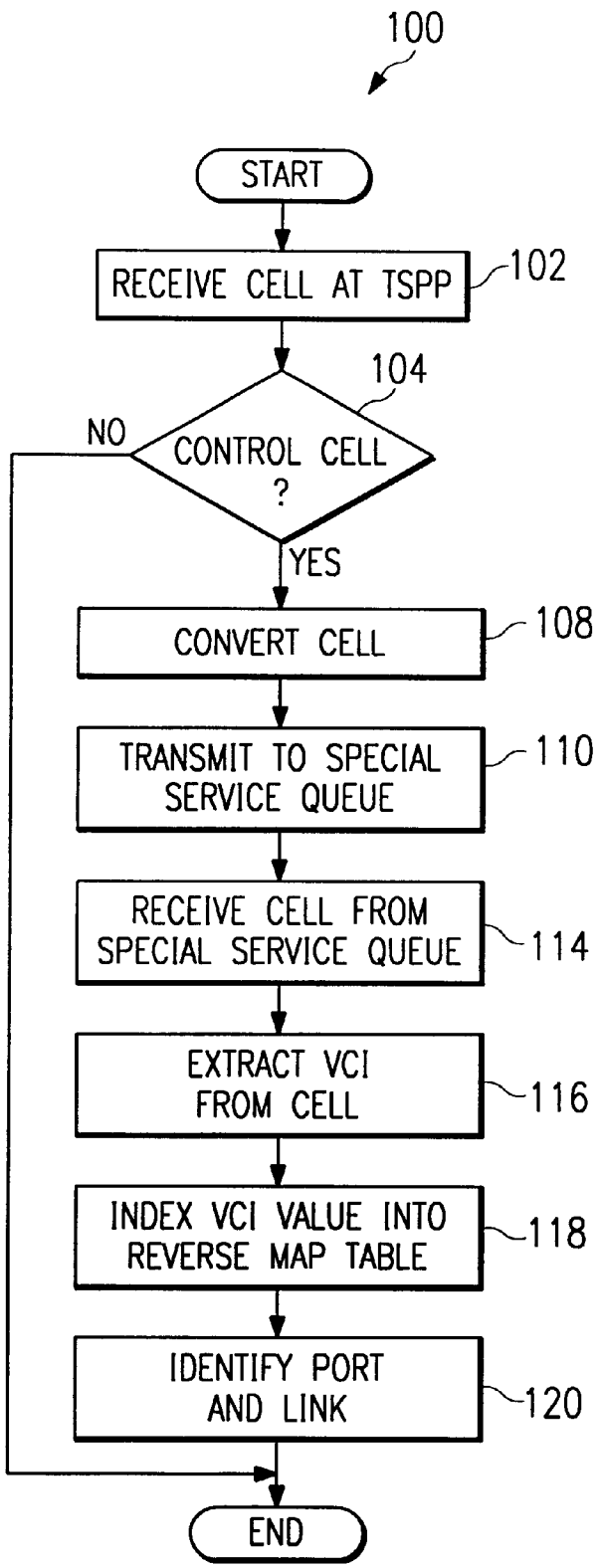
FIG. 2 is a flow chart of a method for identifying a link and port of origin for a control cell in a communication switch.

The preferred embodiment of the present invention and its advantages are best understood by referring to FIGS. 1 and 2 of the drawings, like numerals being used for like and corresponding parts of the various drawings.

FIG. 1 illustrates a system 10 for identifying a link and a processing port of origin for a control cell in a communication switch. System 10 includes at least one to-switch processing port (TSPP) 12, at least one logical link table 14, switching fabric 16, a switch control module (SCM) 18, and a reverse mapping table 20.

As shown in FIG. 1, system 10 includes two TSPPs 12, labeled as TSPP0 and TSPP1. Each TSPP 12 can be implemented as an application specific integrated circuit (ASIC). Each TSPP 12 may include a number of connections or links 22. Links 22 may support asynchronous transfer mode (ATM) cell relay (OC-12, OC-3c, 155 Mbps UTP), frame relay (T1, E1, T3, E3, V.35), circuit emulation (T1, E1, T3, E3), internetworking using Ethernet, Fast Ethernet, Internet Protocol (IP), or IP over ATM, or any other communications protocol or access technology. In the embodiment shown in FIG. 1, each TSPP 12 may support or include eight links 22, which are labeled as LINK0–LINK7. Each link 22 is operable to receive a data cell, including control cells 24 which are labeled as CELL1, CELL2, and CELL3. The term "control cells" refers to cells that contain signaling or administration information. Each control cell 24 includes a virtual path identification (VPI) field 26 and a virtual channel identification (VCI) field 28. VPI field 26 and VCI field 28 may be numerical values. For a particular type of control cell 24, the numerical values for VPI field 26 and the VCI field 28 are specific. For example, as shown in FIG. 1, CELL1, CELL2 and CELL3 may each be an interim local management interface (ILMI) control cell where VPI field 26 has a value of "0" and VCI field 28 has a value of "16." These values for VPI field 26 and VCI field 28 are the same for every ILMI control cell, regardless of the link 22 or TSPP 12 at which the control cell 24 is received. As described below in more detail, each TSPP 12 is operable to convert the control cells 24 that it receives into converted cells 38, which are labeled as CCELL1, CCELL2, and CCELL3 in FIG. 1. Each of these converted cells 38 may have a VPI 40 and a VCI 42. The values of the VCI 42 in converted cells 38 differ even if the converted cells 38 all correspond to the same type of control cell 24.

A separate logical link table 14 is associated with each TSPP 12. The logical link tables 14 shown in FIG. 1 are labeled as LLT0 and LLT1. LLT0 and LLT1 are associated with TSPP0 and TSPP1, respectively. Each logical link table 14 may be implemented on a memory internal or external to its associated TSPP 12, such as an external random access memory (RAM). Logical link tables 14 each comprise a plurality of logical link entries 30, which are labeled as LL#0–LL#7 in FIG. 1. Each logical link entry 30 corresponds to a particular link 22 in the TSPP 12 associated with the logical link table 14. For example, LL#0–LL#7 in LLT0 correspond to LINK0–LINK7 in TSPP0, respectively. Likewise, LL#0–LL#7 in LLT1 correspond to LINK0–LINK7 in TSPP1, respectively. Each logical link entry 30 may specify a numerical value, which is unique to a particular link 22 of a particular TSPP 12. In one embodiment, each numerical value may be implemented as a nine-bit binary number. Consequently, five hundred and twelve numerical values may be supported for the various logical link entries 30. The logical link entries 30 are used in converting control cells 24 to converted cells 38, as described below. The information in logical link tables 14 can be configured or initialized by software.

Switch fabric 16 is connected to each TSPP 12. Switch fabric 16 is operable to transfer a data cell, such as control cells 24, from a TSPP 12 to a from-switch processing port (FSPP). Switch fabric 16 can be implemented as an ECL cross-point device for transferring signals. In one embodiment, switch fabric 16 supports sixteen TSPPs 12.

SCM 18 is connected to switch fabric 16. SCM 18 may be implemented as one or more ASICs. SCM 18 includes an FSPP 32 having a special queue 34. FSPP 32 may also be implemented as an ASIC. Special queue 34 may be dedicated to receiving converted cells 38 corresponding to control cells of a particular type, such as ILMI control cells. As shown in FIG. 1, special queue 34 receives or contains CCELL1, CCELL2, and CCELL3.

Reverse mapping table 20 may be associated with special queue 34 in FSPP 32 of SCM 18. Reverse mapping table 20 may be implemented on memory (e.g., RAM) internal or external to FSPP 32. Reverse mapping table 20 comprises a plurality of reverse mapping entries 36. Each of reverse mapping entries 36 comprises information identifying a specific link 22 and TSPP 12 at which a control cell 24 can be received. Reverse mapping table 20 can be indexed by the numerical values specified in logical link entries 30. Like logical link tables 14, the information in reverse mapping table 20 can be configured or initialized by software.

In operation, the TSPPs 12 may receive control cells 24 at various links 22. As shown in FIG. 1, CELL1 and CELL2 may be received at LINK2 and LINK7 of TSSP0, respectively, and CELL3 may be received at LINK6. If these control cells 24 are the same type, the numerical value for the VPI field 26 of all cells will be the same. Likewise, the numerical value for the VCI field 28 of all cells will be the same. VPI field 26 and VCI field 28 of the cells shown in FIG. 1 have numerical values of 0 and 16, respectively. If the control cells 24 received by a TSPP 12 are of a certain type as determined by the VPI and VCI, then the TSPP 12 replaces the numerical value for VCI field 28 of the received cells with a numerical value stored in the logical linking table 14 associated with that TSPP 12. In particular, the TSPP 12 uses the logical link entry 30 corresponding to the link 22 at which the control cell 24 is received to replace the numerical value of the VCI field 28. In this manner, TSPP 12 converts control cells 24 to converted cells 38.

For example, because CELL1 is received at LINK2 of TSSP0, the numerical value of "285" specified in LL#2 of LLT0 is used to replace the VCI value of "16". Likewise, because CELL2 is received at LINK7 of TSSP0, the VCI value of "16" in CELL2 is replaced with a VCI value of "220" specified in LL#7 of LLT0. Similarly, because CELL3 is receive at LINK6 of TSPPI, the VCI value of "16" in CELL3 is replaced with the value of "96" specified in LL#6 of LLT1. In this manner, CELL1, CELL2, and CELL3 may be converted into CCELL1, CCELL2, and CCELL3. TSPPs 12 transmit the converted cells 38 to SCM 18, which receives the converted cells 38 at special queue 34 dedicated to this particular type of control cell. When SCM 18 receives a converted cell 38, it is able to identify the link and processing port at which the corresponding control cell 24 was received using reverse mapping table 20.

It should be understood that a separate set comprising one or more logical link tables 14, a special queue 34, and a reverse mapping table 20 can be maintained for each type of control cell in a switch.

FIG. 2 is a flow chart of a method 100 for identifying a link 22 and a TSPP 12 of origin for a control cell 24 in a communication switch. Method 100, which corresponds to the operation of system 10 shown in FIG. 1, is described with particular reference to the processing of exemplary CELL1. Method 100 begins at step 102, where a TSPP 12 receives an information cell 24 at one of its links 22. For example, TSSP0 receives CELL1 at LINK2. At step 104, TSPP 12 determines whether the cell is a control cell 24. For example, in one embodiment, a queue number associated with the cell is used to look-up a queue descriptor. The queue descriptor may contain a logical link (LL) bit that specifies whether the cell should be converted.

If the received cell is not a control cell 24, method 100 ends. Otherwise, if the received cell is a control cell 24, then at step 108 TSPP 12 references its associated logical link table 14 and converts the control cell 24 into a converted cell 38. In particular, TSPP 12 replaces the value of VCI field 28 in the control cell 24 with a numerical value specified by the logical link entry 30 corresponding to the link 22 at which control cell 24 was received. Thus, because CELL1 was received at LINK2 of TSSP0, TSSP0 replaces the VCI field 28 value of "16" with a value of "285" specified by LL#2 in LLT0. This results in CCELL1, a converted cell 38 having a VCI 42 value of "285."

At step 110, TSPP 12 transmits the converted cell 38 to special queue 34 of FSPP 32 in SCM 18. Special queue 34 receives only information cells of a particular type, such as cells relating to ILMI control.

SCM 18 receives the converted cell 38 from special queue 34 at step 114. At step 116, SCM 18 extracts the VCI 42 value from the converted cell 38. The VCI 42 value is used to index a reverse mapping entry 36 in reverse mapping table 20 at step 118. The reverse mapping entry 36 specifies the link 22 and TSPP 12 at which the control cell 24 corresponding to the converted cell 38 was received. Accordingly, SCM 18 is able to identify the TSPP 12 and link 22 of origin for the control cell 24 at step 128. Thus, with regard to the example, the VCI 42 value of "285" is used to reference the reverse mapping entry 30 specifying "LINK2 TSPP0." SCM 18 may then respond at the link 22 and TSPP 12 of origin if appropriate.

Although the present invention and its advantages have been described detail, it should be understood that various changes, substitutions, and alterations can be made therein without departing from the spirit and scope of the invention as defined by the appended claims.

What is claimed is:

1. A system for identifying a processing port and a link at which a cell is received, comprising:

a processing port operable to receive the cell at one of a plurality of links;

a logical link table comprising a plurality of logical link entries, each logical link entry corresponding to a particular link of the processing port associated with the logical link table, each logical link entry specifying a logical link value for uniquely identifying the processing port and the particular link corresponding to that logical link entry, the processing port operable to convert the cell by replacing a numerical value of an identification field of the cell with the logical link value specified by the logical link entry corresponding to the link at which the cell is received; and a switch control module connected to the processing port, the switch control module operable to receive the converted cell, the switch control module operable to identify the link and the processing port at which the cell corresponding to the converted cell was received by referencing a reverse mapping table using the logical link value stored in the identification field of the converted cell, and wherein the reverse mapping table comprises a plurality of reverse mapping entries, each reverse mapping entry specifying a particular link of a particular processing port.

2. The system of claim 1, further comprising a switching fabric connecting the processing port to the switch control module.

3. The system of claim 1, wherein the switch control module further comprises a special queue operable to receive the converted cell.

4. The system of claim 1, wherein the processing port is further operable to determine whether the received cell is a control cell.

5. The system of claim 1, wherein the cell is a control cell destined for the switch control module.

6. The system of claim 1, wherein the logical link table is stored in a random access memory external to the processing port.

7. The system of claim 1, wherein the identification field of the cell comprises a virtual channel identification field.

8. The system of claim 1, wherein the port processor routes the cell in response to a determination that the cell is not a control cell.

9. A system of identifying a processing port and a link at which a cell is received, comprising:

a processing port operable to receive the cell at one of a plurality of links;

a logical link table associated with the processing port, the logical link table comprising a plurality of logical link entries, each logical link entry corresponding to a particular link of the processing port associated with the logical link table, each logical link entry specifying a logical link value, the processing port operable to access the logical link table, the processing port operable to convert the cell by replacing a numerical value of a virtual channel identification field of the cell with the logical link value specified by the logical link entry corresponding to the link at which the cell is received;

a reverse mapping table comprising a plurality of reverse mapping entries, each reverse mapping entry specifying a particular link of a particular processing port, the reverse mapping table operable to be indexed using the logical link values specified by the logical link entries of the logical link table; and a switch control module coupled to the processing port and operable to access the reverse mapping table, the switch control module operable to receive the converted cell, the switch control module operable to identify the link and the processing port at which the cell corresponding to the converted cell was received by referencing the reverse mapping table using the logical link value in the virtual channel identification field of the converted cell.

10. The system of claim 9, wherein the cell is a control cell destined for the switch control module.

11. The system of claim 9, wherein the switch control module further comprises a special queue operable to receive the converted cell.

12. The system of claim 9, wherein the processing port is operable to route the cell through a switching fabric to another processing port in response to a determination that the cell is not a control cell.

13. A method for identifying a processing port and a link at which a cell is received, comprising the steps of:

receiving the cell at one of a plurality of links of the processing port;

referencing a logical link table associated with the processing port, the logical link table comprising a plurality of logical link entries, each logical link entry corresponding to a particular link of the processing port, each logical link entry specifying a logical link value;

converting the cell by replacing a numerical value of an identification field of the cell with the logical link value specified by the logical link entry corresponding to the link at which the cell is received; and identifying the link and the processing port at which the cell was received by referencing a reverse mapping table using the logical link value stored in the identification field of the converted cell.

14. The method of claim 13, further comprising the steps of:
- determining whether the received cell is a control cell; and
- converting the received cell responsive to determining that the received cell is a control cell.

15. The method of claim 13, further comprising the step of receiving the converted cell at a special queue.

16. The method of claim 13, wherein the identification field of the cell comprises a virtual channel identification field.

17. The method of claim 13, further comprising the step of returning a control cell to the link and processing port associated with the converted cell in response to the converted cell.

18. A method for identifying a processing port and a link at which a cell is received, comprising:
- receiving the cell from one of a plurality of links associated with the processing port;
- converting the cell by storing a logical link value within the cell, the logical link value for uniquely identifying the processing port and the link from which the cell was received, and wherein converting the cell includes replacing a numerical value of an identification field of the cell with the logical link value;
- receiving the converted cell by a switch control module connected to the processing port; and
- identifying the logical link and the processing port at which the cell corresponding to the converted cell was received by referencing a reverse mapping table using the logical link value stored in the converted cell, wherein the reverse mapping table comprises a plurality of reverse mapping entries, each reverse mapping entry specifying a particular link of a particular processing port.

19. The method of claim 18, wherein the logical link value is specified by a logical link entry corresponding to the link from which the cell is received, the logical link entry being one of a plurality of logical link entries in a logical link table.

20. The method of claim 18, wherein a switching fabric connects the processing port to the switch control module.

21. The method of claim 18, further comprising storing the converted cell in a special queue for converted control cells in the switch control module.

22. The method of claim 18, further comprising determining whether the received cell is a control cell.

23. The method of claim 18, wherein the cell is a control cell destined for the switch control module.

24. The method of claim 19, wherein the logical link table is stored in a random access memory external to the processing port.

25. The method of claim 18, wherein the identification field of the cell comprises a virtual channel identification field.

26. The method of claim 18, further comprising routing the cell in response to a determination that the cell is not a control cell.

* * * * *

UNITED STATES PATENT AND TRADEMARK OFFICE
CERTIFICATE OF CORRECTION

PATENT NO.     : 6,236,655 B1
DATED          : May 22, 2001
INVENTOR(S)    : Stephen A. Caldara et al.

It is certified that error appears in the above-identified patent and that said Letters Patent is hereby corrected as shown below:

Column 6,
Line 15, "value, the" should read -- value, each logical link value uniquely indentifying the --;
Line 16, "table," should read -- table and the particular link corresponding to that logical link entry, -- and
Line 54, "value;" should read -- value for uniquely identifying the process port and the particular link corresponding to that logical link entry; --.

Signed and Sealed this

Eighth Day of October, 2002

Attest:

JAMES E. ROGAN
Attesting Officer     Director of the United States Patent and Trademark Office